US011334627B2

(12) United States Patent
Moran

(10) Patent No.: US 11,334,627 B2
(45) Date of Patent: May 17, 2022

(54) DATA PROCESSING

(71) Applicant: Arm Limited, Cambridge (GB)

(72) Inventor: Brendan James Moran, Histon (GB)

(73) Assignee: Arm Limited, Cambridge (GB)

( * ) Notice: Subject to any disclaimer, the term of this patent is extended or adjusted under 35 U.S.C. 154(b) by 367 days.

(21) Appl. No.: 16/509,657

(22) Filed: Jul. 12, 2019

(65) Prior Publication Data

US 2021/0011951 A1   Jan. 14, 2021

(51) Int. Cl.
*G06F 7/00* (2006.01)
*G06F 16/901* (2019.01)
*G06F 9/48* (2006.01)
*G06F 9/50* (2006.01)
*G06F 9/46* (2006.01)

(52) U.S. Cl.
CPC .......... *G06F 16/9027* (2019.01); *G06F 9/468* (2013.01); *G06F 9/4812* (2013.01); *G06F 9/5022* (2013.01); *G06F 9/5061* (2013.01)

(58) Field of Classification Search
CPC ...... G06F 9/468; G06F 9/4812; G06F 9/5022; G06F 9/5061; G06F 16/9027
USPC .................. 707/696; 717/149, 157, 162–164
See application file for complete search history.

(56) References Cited

U.S. PATENT DOCUMENTS

| | | | | |
|---|---|---|---|---|
| 5,727,209 A | * | 3/1998 | Slingwine | G06F 9/52 718/102 |
| 7,730,491 B2 | * | 6/2010 | Kukanov | G06F 9/526 718/108 |
| 7,844,973 B1 | * | 11/2010 | Dice | G06F 9/52 718/108 |
| 9,734,064 B2 | * | 8/2017 | Vorbach | G06F 12/0815 |

OTHER PUBLICATIONS

R.A.Van Engelen, "Names, Scopes, and Bindings", 2006, FSU—Department of Computer Science, 24 pages. (Year: 2006).*
John D.Valois, "Lock-Free Linked Lists Using Compare-and-Swap", 1995, ACM, pp. 214-222. (Year: 1995).*
Hendler et al., "Scalable Lock-free Stack Algorithm", 2004, ACM, 25 pages. (Year: 2004).*

* cited by examiner

*Primary Examiner* — Ted T. Vo
(74) *Attorney, Agent, or Firm* — Nixon & Vanderhye P.C.

(57) ABSTRACT

A computer-processor-implemented data processing method comprises: a computer processor executing instances of one or more processing functions, each instance of a processing function having an associated function-call identifier; and in response to initiation of execution by the computer processor of a given processing function instance configured to modify one or more pointers of a partitioned acyclic data structure: the computer processor storing the function-call identifier for that processing function instance in a memory at a storage location associated with the partitioned acyclic data structure; for a memory location which stores data representing a given pointer of the partitioned acyclic data structure, the computer processor defining a period of exclusive access to at least that memory location by applying and subsequently releasing an exclusive tag for at least that memory location; and the computer processor selectively processing the given pointer during the period of exclusive access in dependence upon whether the function-call identifier of the prevailing processing function instance is identical to the function-call identifier stored in association with the partitioned acyclic data structure.

11 Claims, 15 Drawing Sheets

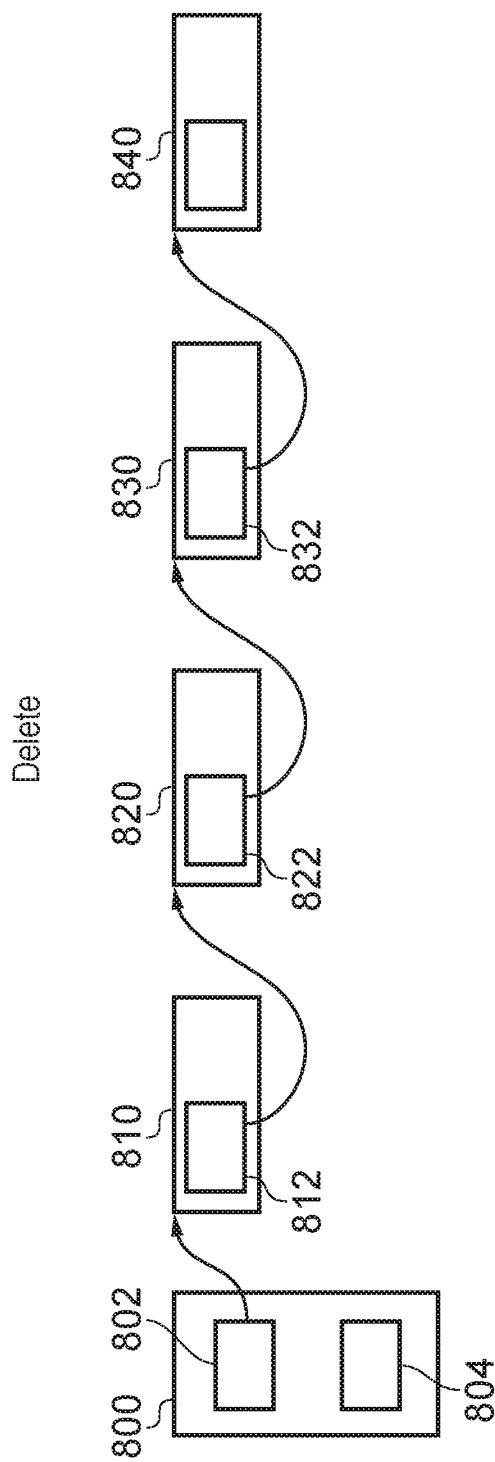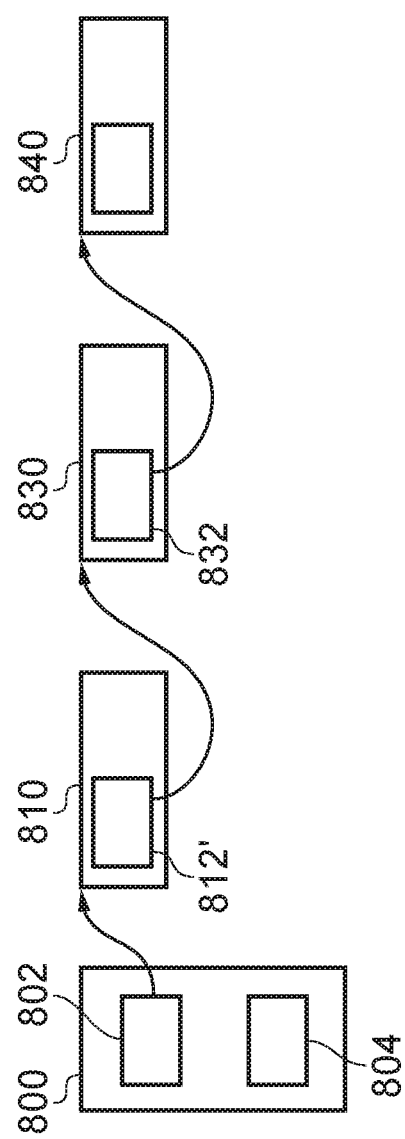

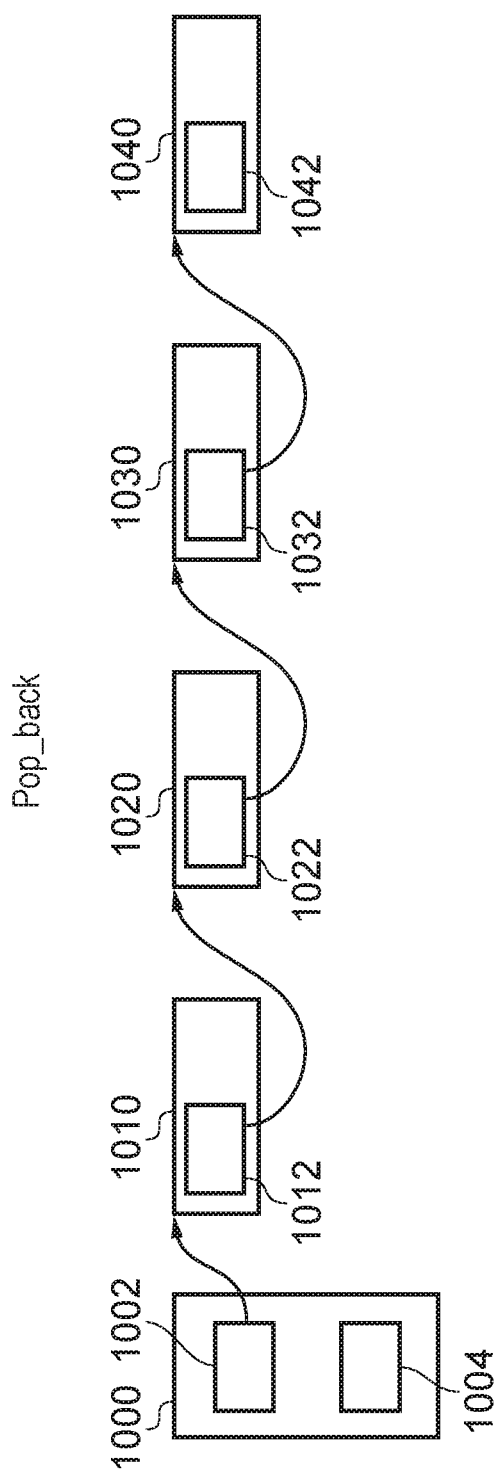
FIG. 10A
FIG. 10B
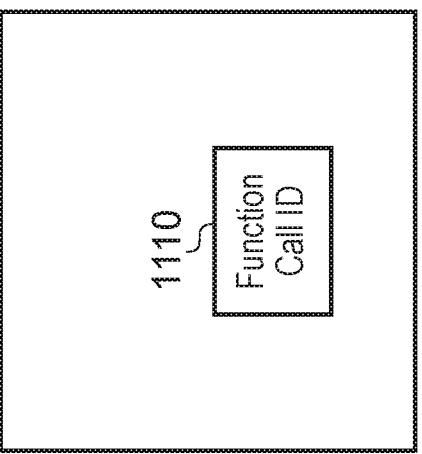
FIG. 11

DATA PROCESSING

BACKGROUND

This disclosure relates to data processing methods and apparatus.

In a data processing system handling partitioned acyclic data structures such as linked lists, if a processor exception, interrupt or the like occurs while the data processing system is engaged in making a change to the partitioned acyclic data structure (for example, adding or deleting an element of the partitioned acyclic data structure), there can be potential problems relating to maintaining the integrity and correct structure of the resulting partitioned acyclic data structure.

It is desirable to alleviate such issues.

SUMMARY

In an example arrangement there is provided a computer-processor-implemented data processing method comprising:

a computer processor executing instances of one or more processing functions, each instance of a processing function having an associated function-call identifier; and in response to initiation of execution by the computer processor of a given processing function instance configured to modify one or more pointers of a partitioned acyclic data structure:

the computer processor storing the function-call identifier for that processing function instance in a memory at a storage location associated with the partitioned acyclic data structure;

for a memory location which stores data representing a given pointer of the partitioned acyclic data structure, the computer processor defining a period of exclusive access to at least that memory location by applying and subsequently releasing an exclusive tag for at least that memory location; and the computer processor selectively processing the given pointer during the period of exclusive access in dependence upon whether the function-call identifier of the prevailing processing function instance is identical to the function-call identifier stored in association with the partitioned acyclic data structure.

In another example arrangement there is provided a non-transitory machine-readable storage medium which stores program instructions which, when executed by a computer processor, cause the computer processor to perform the steps of a method comprising:

executing instances of one or more processing functions, each instance of a processing function having an associated function-call identifier; and in response to initiation of execution of a given processing function instance configured to modify one or more pointers of a partitioned acyclic data structure:

storing the function-call identifier for that processing function instance in association with the partitioned acyclic data structure;

for a memory location storing data representing a given pointer of the partitioned acyclic data structure, defining a period of exclusive access to at least that memory location by applying and subsequently releasing an exclusive tag for at least that memory location; and selectively processing the given pointer during the period of exclusive access in dependence upon whether the function-call identifier of the prevailing processing function instance is identical to the function-call identifier stored in association with the partitioned acyclic data structure.

In another example arrangement there is provided a data processor comprising: processing circuitry configured, under the control of a set of processing instructions, to perform the steps of:

executing instances of one or more processing functions, each instance of a processing function having an associated function-call identifier; and in response to initiation of execution of a given processing function instance configured to modify one or more pointers of a partitioned acyclic data structure:

storing the function-call identifier for that processing function instance in association with the partitioned acyclic data structure;

for a memory location storing data representing a given pointer of the partitioned acyclic data structure, defining a period of exclusive access to at least that memory location by applying and subsequently releasing an exclusive tag for at least that memory location; and selectively processing the given pointer during the period of exclusive access in dependence upon whether the function-call identifier of the prevailing processing function instance is identical to the function-call identifier stored in association with the partitioned acyclic data structure.

In another example arrangement there is provided a non-transitory machine-readable storage medium which stores a partitioned acyclic data structure comprises a set of linked data items, each data item comprising a memory location to store data representing a pointer to a next data item in the partitioned acyclic data structure; and which provides a data field associated with the partitioned acyclic data structure to store a function-call identifier of an instance of a processing function in response to initiation of execution of that processing function instance.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which:

FIGS. 8a to 8c illustrate operations relating to a so-called delete operation to a partitioned acyclic data structure;

FIGS. 10a to 10c illustrate operations relating to a so-called pop_back operation to a partitioned acyclic data structure; and FIG. 11 schematically illustrates a machine-readable non-transitory storage medium.

DESCRIPTION OF EMBODIMENTS

Figure 1:
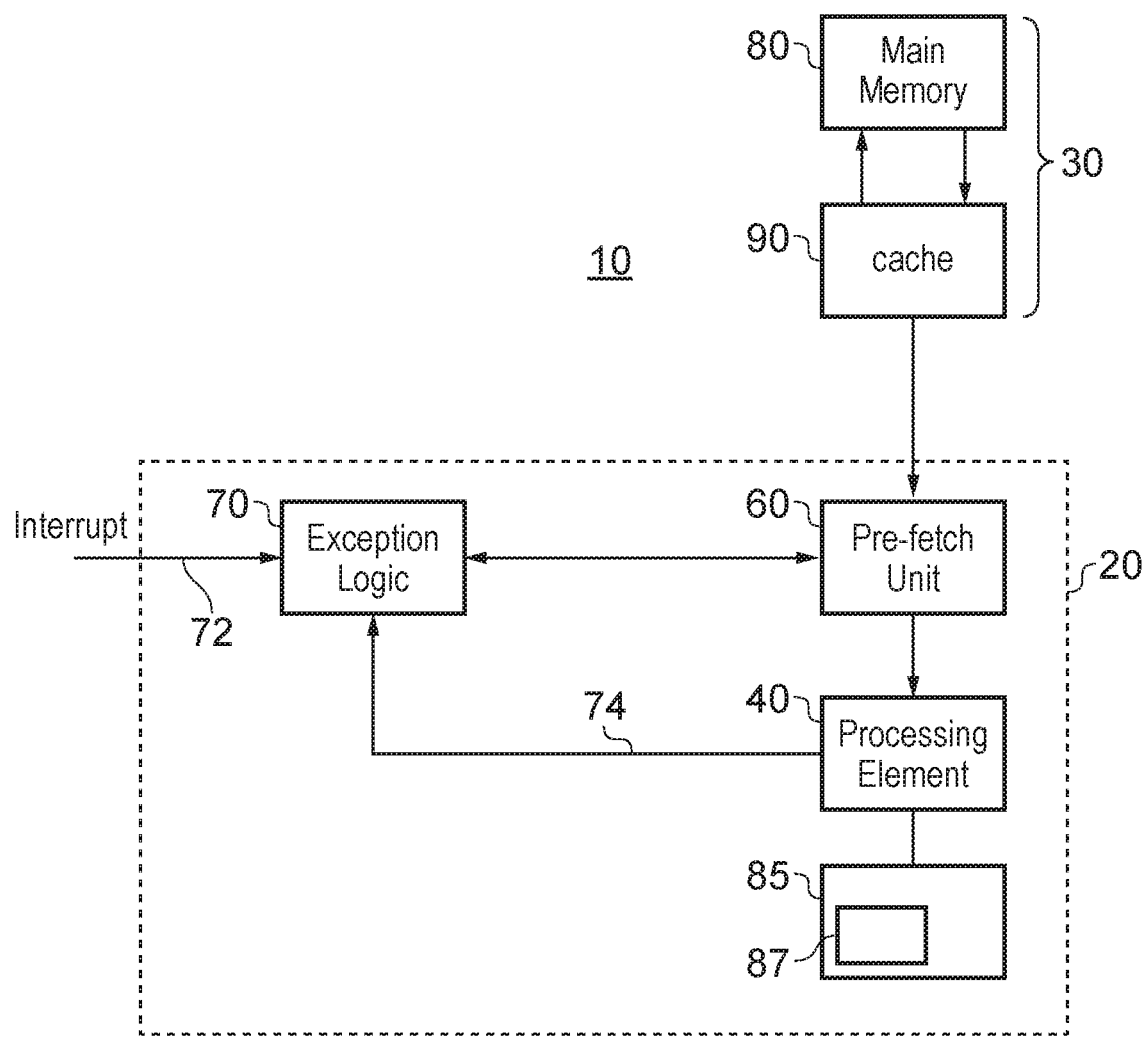
FIG. 1 schematically illustrates a data processing system.

Referring now to the drawings, FIG. 1 is a schematic diagram of a data processing system 10 comprising a data processing apparatus 20 connected to a memory arrangement 30.

The data processing apparatus 20 in this example comprises a processing element or processor core 40 associated with or including an instruction pre-fetch unit 60 and exception logic 70. It is noted that other logic or components may be present, but these are not shown for clarity of the diagram.

The memory arrangement 30 comprises a main memory 80, and an instruction cache (I-cache) 90 disposed between the main memory 80 and the pre-fetch unit 60.

The pre-fetch unit 60 acts as a pipelined instruction fetching unit configured to fetch instructions from memory during a pipeline period of two or more processor clock cycles prior to execution of those instructions by the processor core 40. Generally speaking, the pre-fetch unit 60 is configured to fetch instructions from the instruction cache 90 or, if they are not present in the instruction cache, from the main memory 80 or any intervening cache levels (which, for simplicity of the diagram, are not shown in FIG. 1) and to route those instructions to a decoder of the processor core 40 for decoding.

The exception logic 70 handles so-called exceptions, and in particular is configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address. Other aspects of the handling of exceptions will be discussed below.

During normal program flow, the program counter associated with the processor core 40 increases sequentially through the address space, unless a branch occurs to another address or a so-called branch-with-link occurs to make use of a subroutine. An exception occurs when this normal flow of execution is diverted to allow the processor to handle different events corresponding to internal or external items. These events might be (for example) externally generated interrupts 72, for example when a peripheral device requires a newly-captured data item to be processed, or internally generated events 74 such as the processor trying to access an undefined or unallowable memory address. It is known to handle multiple different exception types in different ways.

The processing element also accesses one or more registers contained in a register bank 85, the registers storing control information for controlling the operation of the processing element 40. The control registers may include registers such as a program counter (PC) register for indicating an address of an instruction corresponding to a current point of execution, a stack pointer (SP) register indicating an address of a location in the memory system 30 of a stack data structure for saving/restoring register states when handling a processor exception, and a link register (LR) for storing a function return address for which processing should branch following the execution of a function. It will of course be appreciated that these are just some of the types of information which could be stored, and in practise a given instruction set architecture may store different or further control parameters as defined by the architecture.

One of the registers 87 is illustrated schematically as storing a variable which will be referred to in the discussion below in a function-call identifier and which, in general, will change in response to calling of another processing function or exception handling routine. This may be, for example, the stack pointer, the link register or another register value. So, the register 87 could be a representation of the SP, or a representation of the LR, or a representation of another register. In general terms, the function-call identifier for a processing function instance is an identifier selected from the list consisting of:

a processor stack pointer associated with that processing function instance;

an identifier of a memory context allocated to that processing function instance;

a program counter value dependent upon an entry point of that processing function; and a thread identifier combined with an interrupt identifier.

In general, any parameter or register value can be used as the function-call identifier, provided that it changes if another function is called during the execution of a given function. In the example case of the SP, if another function were called, further data would be pushed to the stack and so the SP would indeed change. A technique used in embodiments of the disclosure is to store the function-call identifier (for example, to a field or variable referred to below as "Caller ID") before starting an exclusive access operation and then rechecking that the function-call identifier is still the same within the exclusive access operation, showing that (if it is the same) another function has not been called between the start of the process and the execution of the exclusive access operation.

Figure 2:
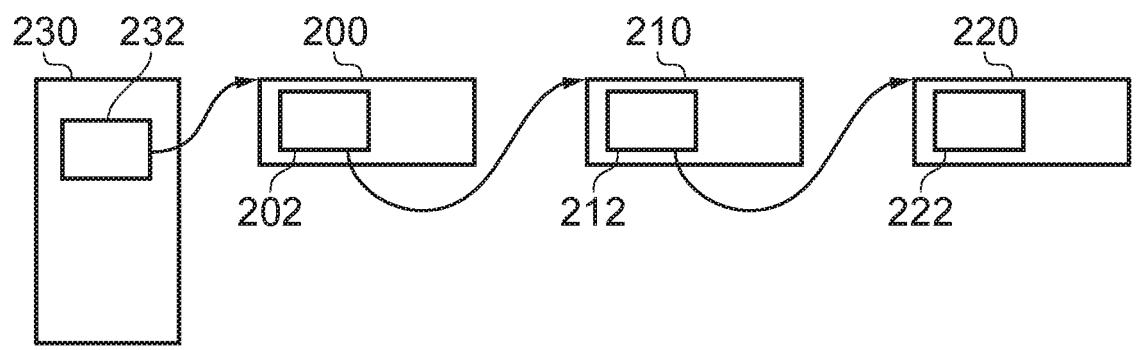
FIG. 2 schematically illustrates a partitioned acyclic data structure.

FIG. 2 schematically illustrates a partitioned acyclic data structure representing a series of data items 200, 210, 220 . . . linked together by pointers 202, 212, 222 such that each pointer is arranged to indicate the storage location of a next data item in the partitioned acyclic data structure. In other words, the pointer 202 provides an indication of the location of the data item 210, and the pointer 212 provides an indication of the storage location of the data item 220.

A head data item 230 provides the starting point in the partitioned acyclic data structure and contains (potentially amongst other header and administrative information) a pointer 232 giving the storage location of the first data item 200 in the partitioned acyclic data structure.

The pointer 222 as drawn may point to a subsequent data item (not shown in FIG. 2) or, if the data item 220 is the last data item in the partitioned acyclic data structure, may indicate that this is the "end" of the succession of data items.

The term "acyclic" indicates a property of the structure. In a singly-linked acyclic list structure, the last data item is not linked back to any other (for example the first) data item in the structure. More generally, however, "acyclic" indicates that no data item links back to itself through zero or more intermediate data items.

An example of a partitioned cyclic data structure of this form is a so-called linked list of data items.

Therefore, in the example of FIG. 2, the partitioned acyclic data structure comprises a set of linked data items, each data item comprising a memory location to store data representing a pointer to a next data item in the partitioned acyclic data structure.

Example operations will be discussed below in which the computer processor 40 initiates and then executes a given processing function instance configured to modify one or more pointers of a partitioned acyclic data structure, for example to insert or delete elements or data items of the partitioned acyclic data structure.

An issue which could occur when such modifications are being made is that the computer processor undertaking the modification is interrupted or otherwise diverted to another process or exception level while the modification is underway. This could potentially result in the modified version being incorrect, if for example a further intervening modification has taken place by the diverted or interrupt process. Techniques are discussed below to alleviate this issue, by providing a record of a function calling identifier (which would change if an intervening function has been called) which is rechecked within a period of exclusive access to the pointer being altered.

Figure 3:
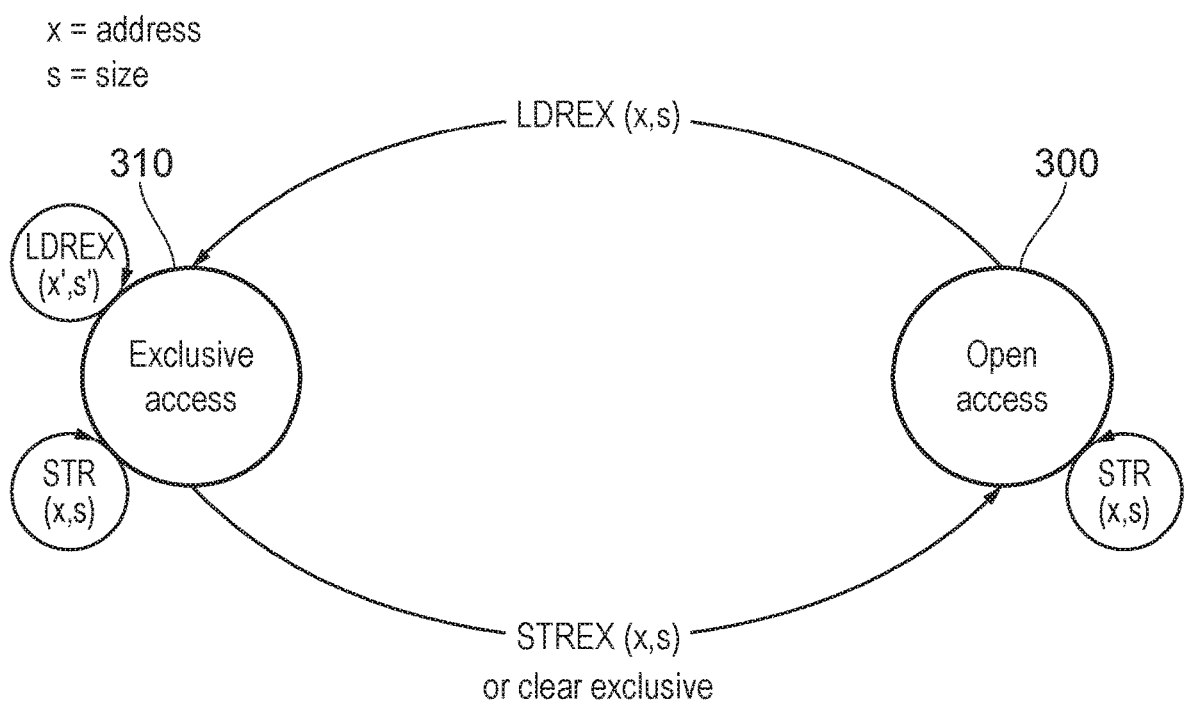
FIG. 3 is a schematic state diagram illustrating aspects of a load exclusive/store exclusive process.

FIG. 3 is a schematic state diagram to illustrate aspects of a system involving exclusive loads and stores.

Exclusive loads and stores are a known way to execute semaphores where the load and store operations are non-atomic. They are used in, for example, the ARM11 MPCore Processor and the Arm v7-m instruction set, licensed by Arm Ltd. This feature enables operations to be performed on loaded data before storing it, with the system of exclusive loads and stores guaranteeing that if data that has been previously loaded by an exclusive load operation has been modified by another CPU or by another process, the subsequent exclusive store fails and the whole load-store sequence must be retried. The exclusive status can be reset or removed either by successfully completing a store exclusive instruction or by executing a "clear exclusive" instruction. Exclusivity can apply to a specific address which is the subject of the exclusive load operation, to a page or region including the address which is the subject of the exclusive load operation, or to the whole of an application address space including the address which is the subject of the exclusive load operation. In the present example, the exclusivity is to the address which is the subject of the exclusive load operation, but in other examples the defining of a period of exclusivity comprises the computer processor applying and subsequently releasing an exclusive tag a range of memory locations including at least the memory location for the given pointer.

Referring to FIG. 3, two states 300 (open access) and 310 (exclusive access) as applicable to a memory or range of memory addresses are shown. Executing an exclusive load LDREX (with example parameters address, size) moves from the state 300 to the state 310. Executing an exclusive store STREX or a clear exclusive instruction transitions from the state 310 to the state 300. While in the state 310, executing a non-exclusive store STR or another exclusive load for a different address range LDREX(x', s') means that the system stays in the state 310.

Figure 4:
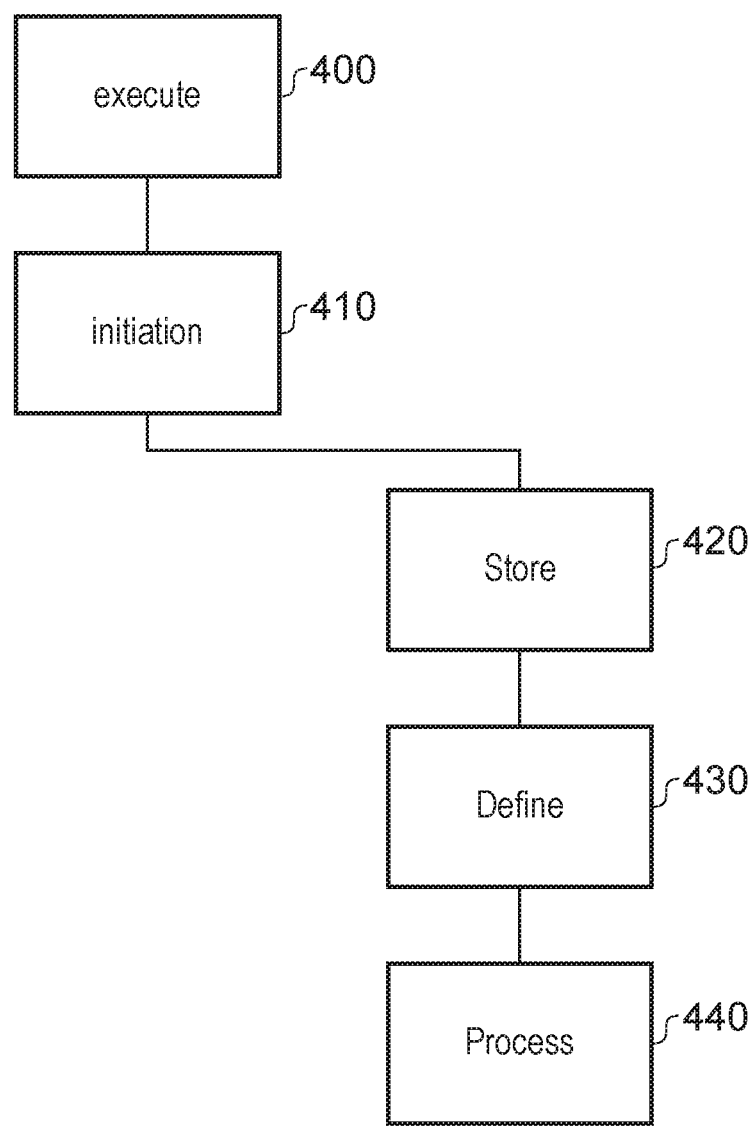
FIG. 4 is a schematic flowchart illustrating a method.

By way of summary of the techniques to be discussed below, FIG. 4 is a schematic flowchart illustrating a computer-processor-implemented data processing method (for example, implemented by the processing element 40 of the data processor 20 of FIG. 1) comprising:

at a step 400, the computer processor 40 executing instances of one or more processing functions, each instance of a processing function having an associated function-call identifier; and in response to initiation of execution by the computer processor (at a step 410) of a given processing function instance configured to modify one or more pointers of a partitioned acyclic data structure:

the computer processor storing (at a step 420) the function-call identifier for that processing function instance in a memory at a storage location associated with the partitioned acyclic data structure;

for a memory location which stores data representing a given pointer of the partitioned acyclic data structure, the computer processor defining (at a step 430) a period of exclusive access to at least that memory location by applying and subsequently releasing an exclusive tag for at least that memory location; and the computer processor selectively processing (at a step 440) the given pointer during the period of exclusive access in dependence upon whether the function-call identifier of the prevailing processing function instance is identical to the function-call identifier stored in association with the partitioned acyclic data structure.

The processing element 40 may implement the above method in response to the execution of program instructions and/or microcode held by a non-transitory machine-readable storage medium which stores program instructions which, when executed by a computer processor, cause the computer processor to perform the steps of the method of FIG. 4. An example of such a storage medium may be the memory arrangement 30 and/or the main memory 80, when such an arrangement or memory is implemented as a non-transitory memory, or by a magnetic or optical disc, a flash RAM, a ROM or the like.

In at least some examples, the period of exclusivity is defined by the use of load exclusive and complementary store exclusive (or clear exclusive) instructions relating to the memory location in question, and within that period of exclusivity, checking that the stored function call identifier has not changed (indicating that another function call has not occurred since the process started).

In all of the examples given below, the process of defining a period of exclusivity comprises the computer processor executing a load-exclusive operation to load from the memory location of the given pointer; and the computer processor subsequently executing one of: a store-exclusive operation to store a value to the memory location of the given pointer; or a clear-exclusive operation to clear the exclusive tag associated with at least the memory location of the given pointer.

The examples below provide pseudocode and flowchart representations of various exemplary processes. In at least some instances, the pseudocode and the flowchart show substantially (or exactly) the same process. Except where it is indicated that the underlying processes are different, if there is any discrepancy between the logical flow of the pseudocode and that of the respective flowchart, this should be taken as indicative of different embodiments representing the same underlying process.

Example: Push_Front

Figure 5A:
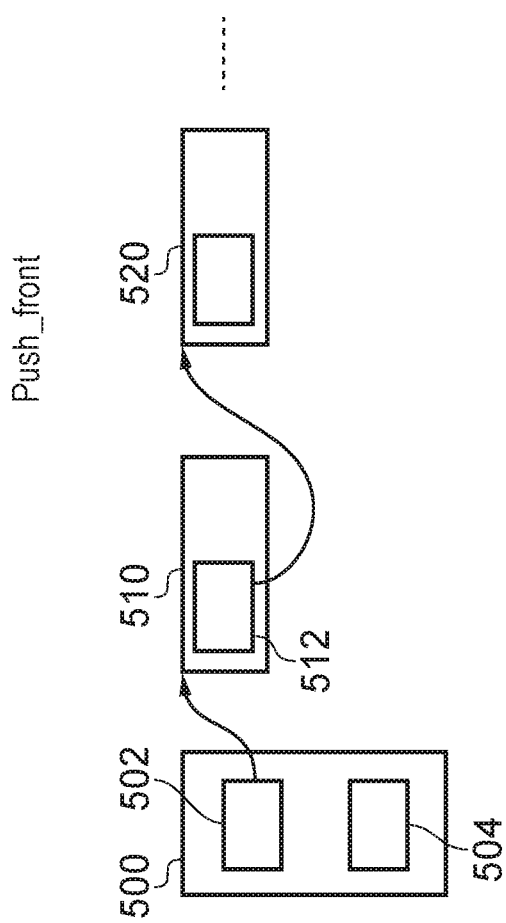
FIGS. 5a to 5c illustrate operations relating to a so-called push_front operation to a partitioned acyclic data structure.

FIGS. 5A and B schematically illustrate a so-called push_front operation.

Figure 5B:
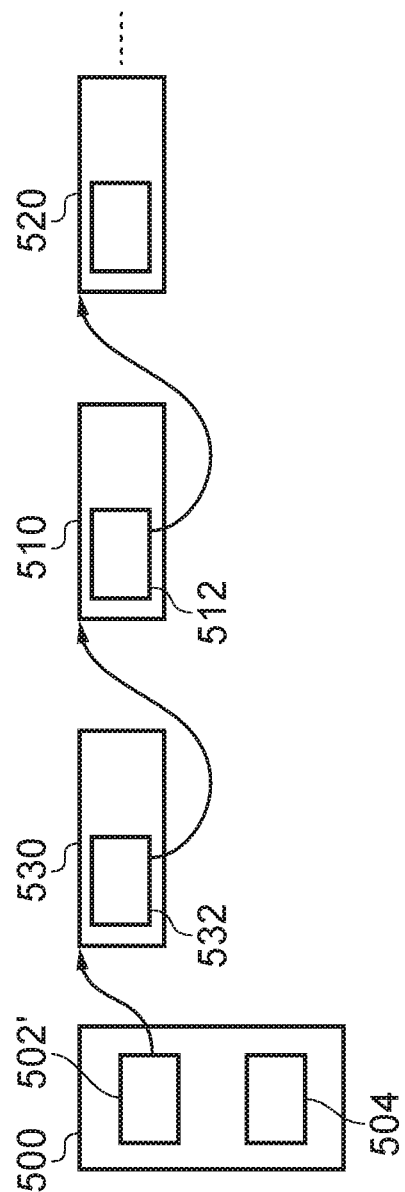

In the example shown, FIG. 5A shows the situation before the push_front operation and FIG. 5B shows the situation after the push_front operation.

Referring to FIG. 5A a head data item 500 contains a pointer 502 to a first data item 510 in turn containing a pointer 512 to a second data item 520.

The push_front operation involves inserting a further data item 530 between the head data item 500 and the previous first data item 510, so that the pointer 502 has to be redirected (as a new value 502') to point to the location of the inserted data item 530, a pointer 532 of the data item 530 points to the location of the original data item 510, and the pointer 512 is unchanged (pointing to the next data item 520).

Note that other data items may be provided after the data item 520 in the partitioned acyclic data structure but these are not shown for clarity of these particular diagrams.

In FIGS. 5A and 5B, a further data field 504 is shown as part of the head data item 500. The field 504 is used to store a function call identifier (or "Caller ID") to be discussed below. The use of an operation to store and subsequently re-check a function call identifier can allow the process to ensure that another process (for example in response to an interrupt) has not been initiated in the meantime, and the feature whereby the re-check of the function call identifier is within a load exclusive—store exclusive operation allows the assurance that when (a) the function call identifier has not changed, and (b) the store exclusive operation is successful, the push_front operation has been carried out validly without inconsistent intervening operations by other processes. The use of the data field (such as 504) provides an example of the computer processor storing the function-call identifier in the memory at a storage location associated with a first data item in the set of linked data items. Note however that it is not necessary to store the function-call identifier as at least a part of (as in this example) or even in association with the first data item; it could be stored in an independent location or register. This however provides a convenient and easily accessible location for storing and subsequently checking this item of information.

The push_front operation will now be described with reference to a pseudocode example, the example being based around a "do . . . until" loop, by which the steps 1-6 of the example are repeated as successive series until the condition (defined following the "Until" statement) is met, at which time the process ends. Note that other iterative conditional loop formulations could be used with equivalent effect, such as "while" loops, "do . . . while" loops or "goto" loops (examples of this being given below). Note that this (and other examples below using a "do . . . until" or a "goto" formulation) provides an example of the computer processor iteratively performing the defining step and the selective processing step for successive pointers associated with successive data items of the set of linked data items.

Do:
- 5.1. Set the Caller ID in the field 504 to the current stack pointer;
- 5.2. Write the head pointer 502 into the "next" pointer 532 of the new element 530;
- 5.3. Read the head pointer 502 (using a load exclusive operation);
- 5.4. Check that the head pointer 502 hasn't changed with respect to the value accessed at step 5.2; if not, return to 5.1;
- 5.5. Check that Caller ID in the field 504 is still the current stack pointer; if not, return to 5.1;
- 5.6. Write the address of the new element 530 into the head pointer as a new value 502' (using a store exclusive operation);

Until the store is successful.

Note that the step 5.5 (and the conditional progress to step 5.6 as a result of step 5.5) provides an example of the computer processor modifying the given pointer when the function-call identifier of the prevailing processing function instance is identical to the function-call identifier stored in association with the partitioned acyclic data structure; and the computer processor inhibiting modification of the given pointer when the function-call identifier of the prevailing processing function instance is different to the function-call identifier stored in association with the partitioned acyclic data structure.

A flowchart representation will now be described with reference to FIG. 5C. Respective notation used in the pseudocode and flowcharts includes the following:

| Pseudocode | Flowchart |
| --- | --- |
| next pointer of current element | Next |

Figure 5C:
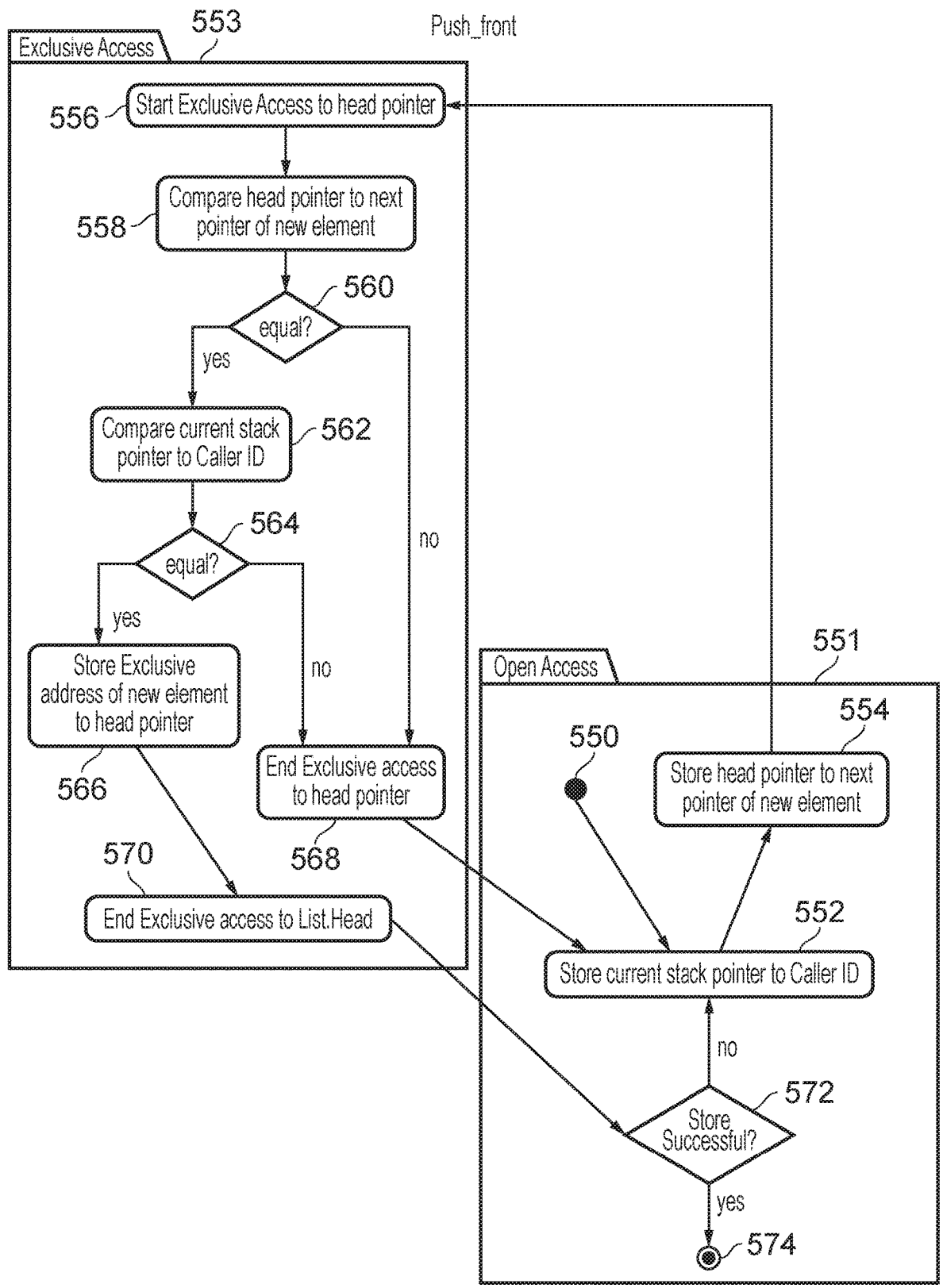

FIG. 5C provides a schematic flowchart indicative of the push_front operation, which starts at a step 550. At a first functional step 552, the current stack pointer is stored to the Caller ID field, representing the step 5.1 discussed above. Control passes to a step 554 at which the head pointer is stored to the next pointer of the new element, corresponding to the step 5.2 discussed above.

Note that these steps are performed in so-called open access, in contrast to other steps performed under exclusive access. Transitions between open access and exclusive access are indicated by arrows passing between a box 551 representing open access operations and a box 553 representing exclusive access operations. A similar notation for distinguishing open and exclusive access operations will be used in respect of other flowcharts discussed below.

From the step 554, control passes to a step 556 at which exclusive access is initiated to the head pointer, for example by reading the head pointer using an exclusive load operation as mentioned in the step 5.3 of the pseudocode.

A step 558 involves comparing the value of the head pointer read at the step 556 to the next pointer of the new element. If these are equal, as detected at a step 560, then this results in a positive outcome of the check at the step 5.4 in the pseudocode. Control then passes to a step 562 at which the current stack pointer is compared to Caller ID. If these are equal, as detected at a step 564, this corresponds to a positive outcome of the step 5.5 in the pseudocode.

If either of the tests 560 or 564 show an inequality, this corresponds to a negative outcome of the checks at the respective step 5.4 or 5.5 of the pseudocode and control passes to a step 568 at which exclusive access to the head pointer is ended and control returns to a step 552. The return to the step 552 represents a continuation of the "Do . . . Until" loop of the pseudocode.

Returning to the positive outcome of the step 564, at a step 566 the address of the new element, is written to the head pointer as a store exclusive operation and, at a step 570, exclusive access to the head pointer is ended.

Control returns to the open access portion 551, and if the store at the step 570 was successful, as detected at a step 572, then the process ends at a step 574. If not, then control returns to the step 552, again representing a continuation of the "Do . . . Until" loop of the pseudocode.

Example: Pop_Front

Figure 6A:
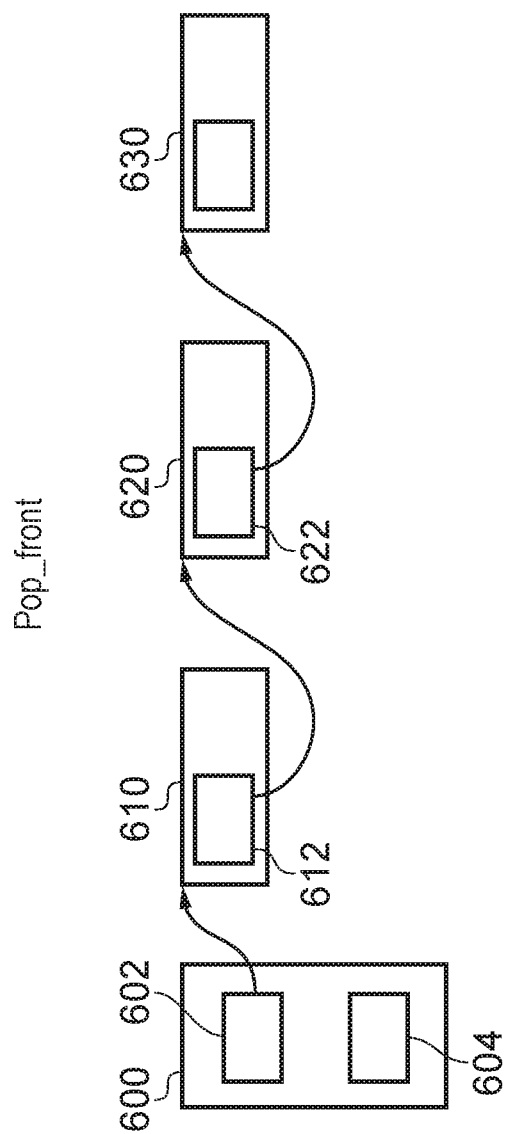
FIGS. 6a to 6c illustrate operations relating to a so-called pop_front operation to a partitioned acyclic data structure.
Figure 6B:
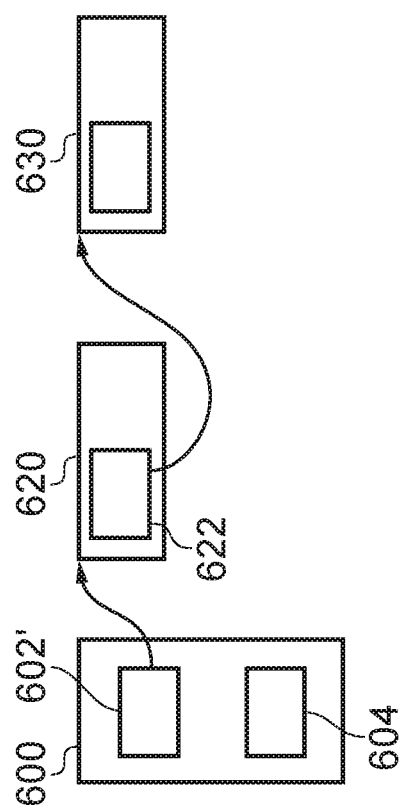

FIGS. 6A and 6B schematically illustrates a pop_front operation. Referring to the situation before the operation, in FIG. 6A, a head data item 600 and three successive data items 610, 620, 630 are shown (further data items may follow the data item 630 but are not shown for clarity of these diagrams). The chain of pointers is such that a pointer 602 of the head data item points to the data item 610, a pointer 612 points to the data item 620, a pointer 622 points to the data item 630 and so on.

The pop_front operation involves removing or "popping" the first data item 610 from the front of the linked list or partitioned acyclic part of the data structure, so that the outcome after the operation as shown in FIG. 6B is that the new first data item is the data item 620 so that the pointer 602' must now point to the location of the data item 620. The pointer 622 is unchanged in that it still points to the location of the data item 630.

A pseudocode example will now be provided, again using a "Do . . . until" loop of the steps 6.1-6.6:

Do:
    6.1. Set the Caller ID field 604 to the current stack pointer;
    6.2. Read the head pointer 602 (using a load exclusive operation);
    6.3. Check that Caller ID field 604 still contains the current stack pointer; if not, return to step 6.1
    6.4. Check that the head pointer 602 is not NULL;
    6.5. Load the first element 610 using the head pointer 602;
    6.6. Write the new head pointer 602' with the next pointer 612 of the current element 610 (using a store exclusive operation);

Until the store is successful.

Note that as before, the step 6.3 (and the conditional progress to step 6.4 and beyond as a result of step 6.3) provides an example of the computer processor modifying the given pointer when the function-call identifier of the prevailing processing function instance is identical to the function-call identifier stored in association with the partitioned acyclic data structure; and the computer processor inhibiting modification of the given pointer when the function-call identifier of the prevailing processing function instance is different to the function-call identifier stored in association with the partitioned acyclic data structure.

Figure 6C:
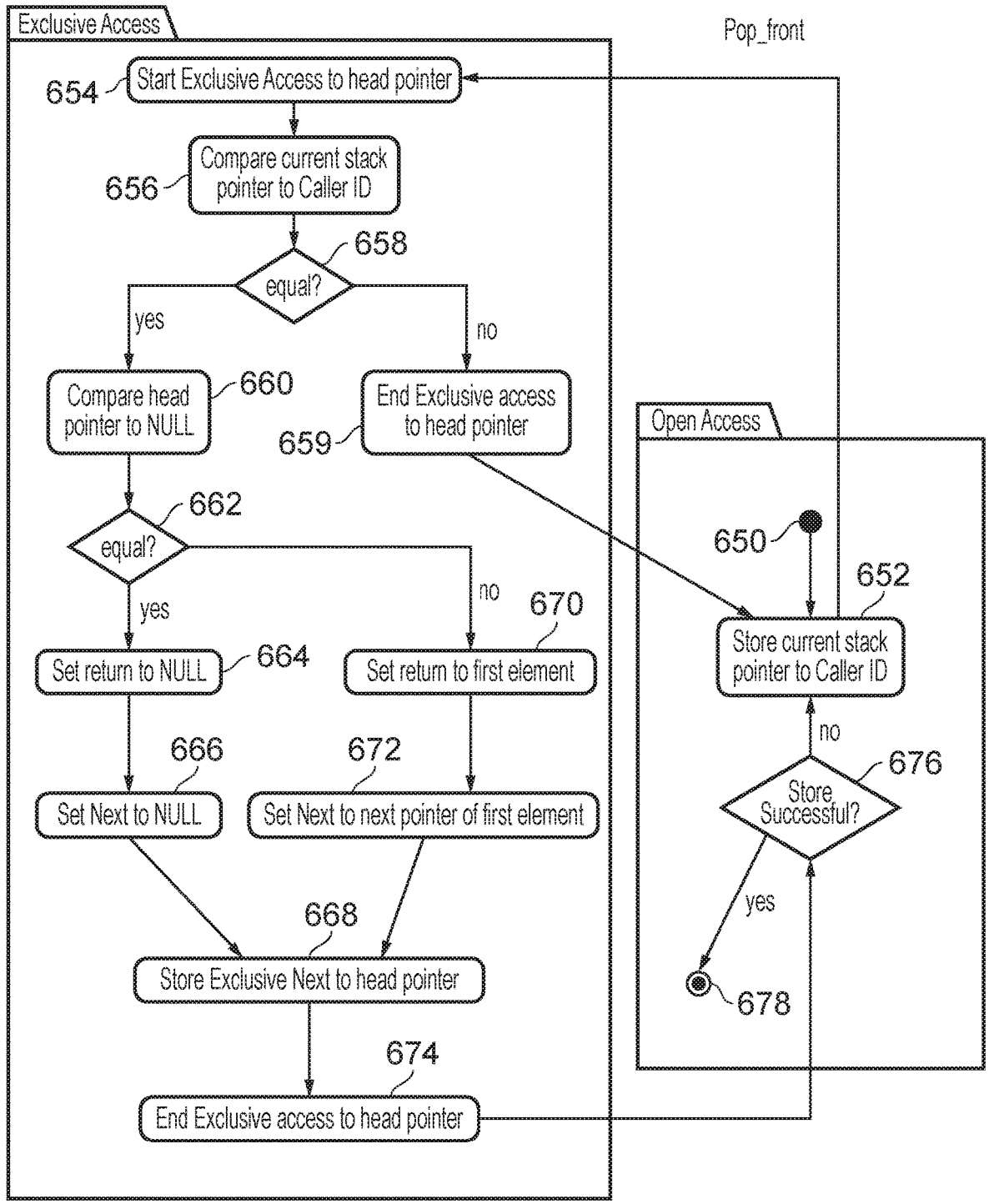

A schematic flowchart representation shown in FIG. 6C relating to the pop_front operation starts at a step 650 in the open access domain. At a step 652, the current stack pointer is stored to Caller ID, corresponding to the step 6.1 of the pseudocode. Control then passes into the exclusive access domain, in that at a next step 654, exclusive access is started to the head pointer, in this example by reading the head pointer using a load exclusive operation. This corresponds to the step 6.2 in the pseudocode.

At a step 656, the current stack pointer is compared to Caller ID, corresponding to the step 6.3 in the pseudocode. If these are equal, as detected at a step 658, then control passes to a step 660, representing the positive outcome of the step 6.3 in the pseudocode. If not, representing the negative outcome of the step 6.3 in the pseudocode, control passes to the step 659 at which exclusive access is ended to the head pointer and control returns to the step 652. This provides an example of a continuation of the "Do . . . Until" loop of the pseudocode.

Returning to the positive outcome of the step 658, at a step 660, the head pointer is compared to a NULL value, corresponding to the step 6.4 in the pseudocode. Noting that the pseudocode step 6.4 is in fact a check that the head pointer is not NULL, the affirmative outcome of this test is represented by the "no" output of the comparison step 652, which passes control to a step 670 at which a return value is set to the head pointer, corresponding to the step 6.5 in the pseudocode. Then, at a step 672, Next is set to the next pointer of the first element. Control passes to a step 668 involving an exclusive store of Next to the head pointer. These processes correspond to the step 6.6 in the pseudocode. At a step 674 exclusive access is ended to the head pointer and, assuming the store is successful as detected at a step 676, the process ends at a step 678 (if not, then as a further continuation of the "Do . . . Until" loop, control returns to the step 652).

Returning to the "yes" outcome of the step 662, representing a failure of the test at the pseudocode step 6.4, both return and Next are set to NULL at respective steps 664 and 668 before control follows the path of the steps 668, 674, 676 as before.

Example: Insert

Figure 7A:
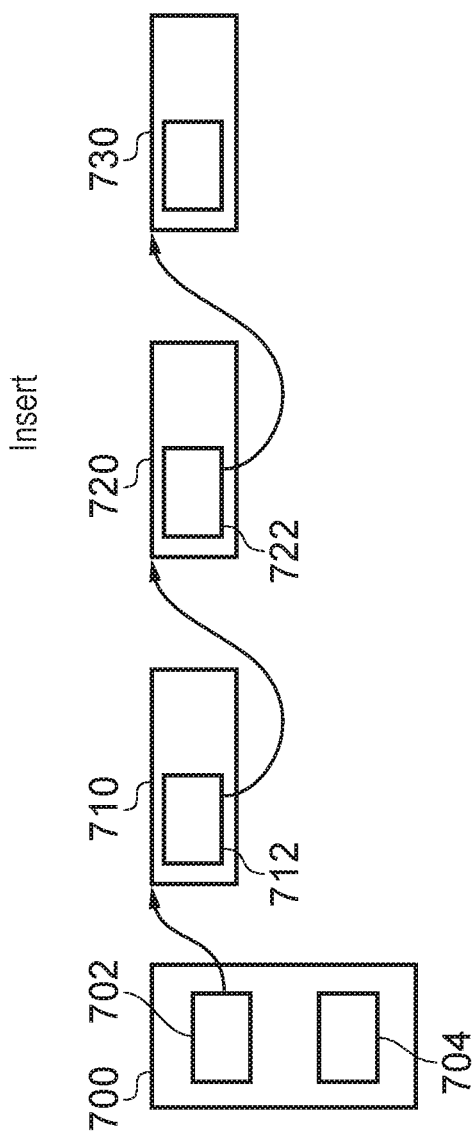
FIGS. 7a to 7c illustrate operations relating to a so-called insert operation to a partitioned acyclic data structure.
Figure 7B:
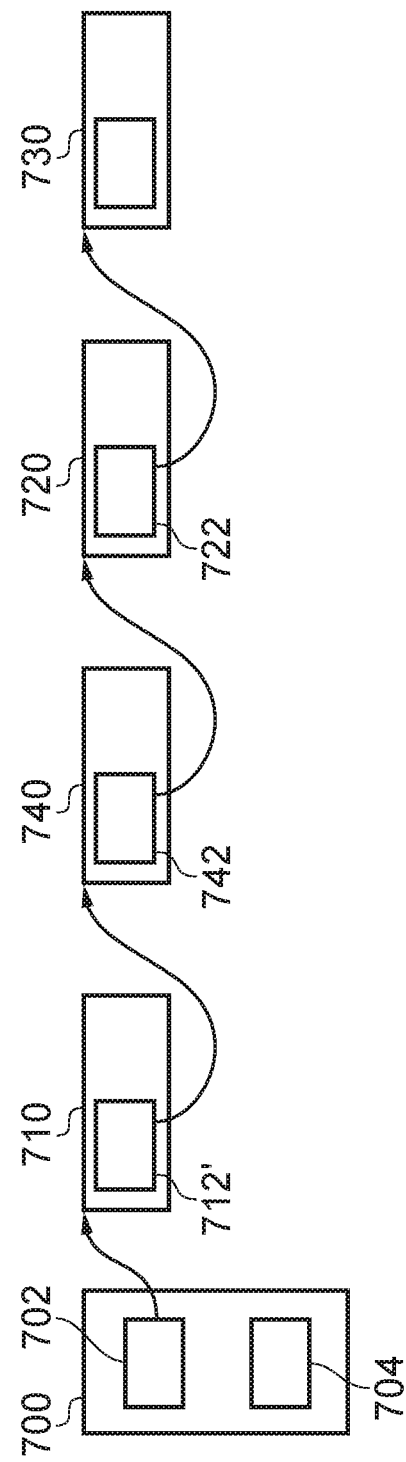

FIGS. 7A and 7B schematically represent an "insert" operation, once again with FIG. 7A representing the situation before the operation and FIG. 7B representing the situation after the operation.

Referring to FIG. 7A, a head data item 700 has a pointer 702 to a first data item 710 having a pointer 712 to a second data item 720 which in turn has a pointer 722 to the location of a third data item 730. As before, further data items may be provided after the second data item 730.

The insert operation involves inserting a data item into the partitioned acyclic data structure, at a position other than that of the first data item or the last data item. For example, a data item 740 having a pointer 742 is inserted between the data items 710 and 720. To implement this, the pointer 702 is unchanged, the pointer 712 is amended so as to point to the location of the inserted data 740. The pointer 742 has to point to the location of the data item 720. The pointer 722 is unchanged.

A pseudocode example will now be provided, involving the successive steps 7.1-7.9 listed below, involving a conditional branching instruction at the steps 7.7 and 7.8. An insert target is defined, which is (in this example) the data item 720, which is to say the element in front of which the "new element" (740 in this example) is to be inserted.

7.1. Set the Caller ID field 704 to the current stack pointer;
    7.2. Set the current_element to the element pointed to by the head pointer 702;
    7.3. If the current_element is NULL, exit with error;
    7.4. Load the next element pointer from the current_element;
    7.5. Set the next pointer 742 of the new element to be equal to the next pointer of the current_element;
    7.6. Load the next pointer of the current_element (using a load exclusive);
    7.7. If the Caller ID is not the current stack pointer, go back to 7.1;
    7.8. If the current_element is not the insert target 720 then set current_element=next element pointed to by current_element and go to 7.3;
    7.9. Set the next pointer of current_element to the address of the new element 740 (using a store exclusive).

In this pseudocode, the steps 7.6 and 7.9, encompassing the step 7.7, ensure that the function call identifier is still the same as when the process started, and because this check is inside a load exclusive—store exclusive loop, a successful store implies that nothing else has written to the next pointer of the current_element in the meantime. Note that the step 7.9 will be reached only when the current_element is the insert target 720.

Figure 7C:
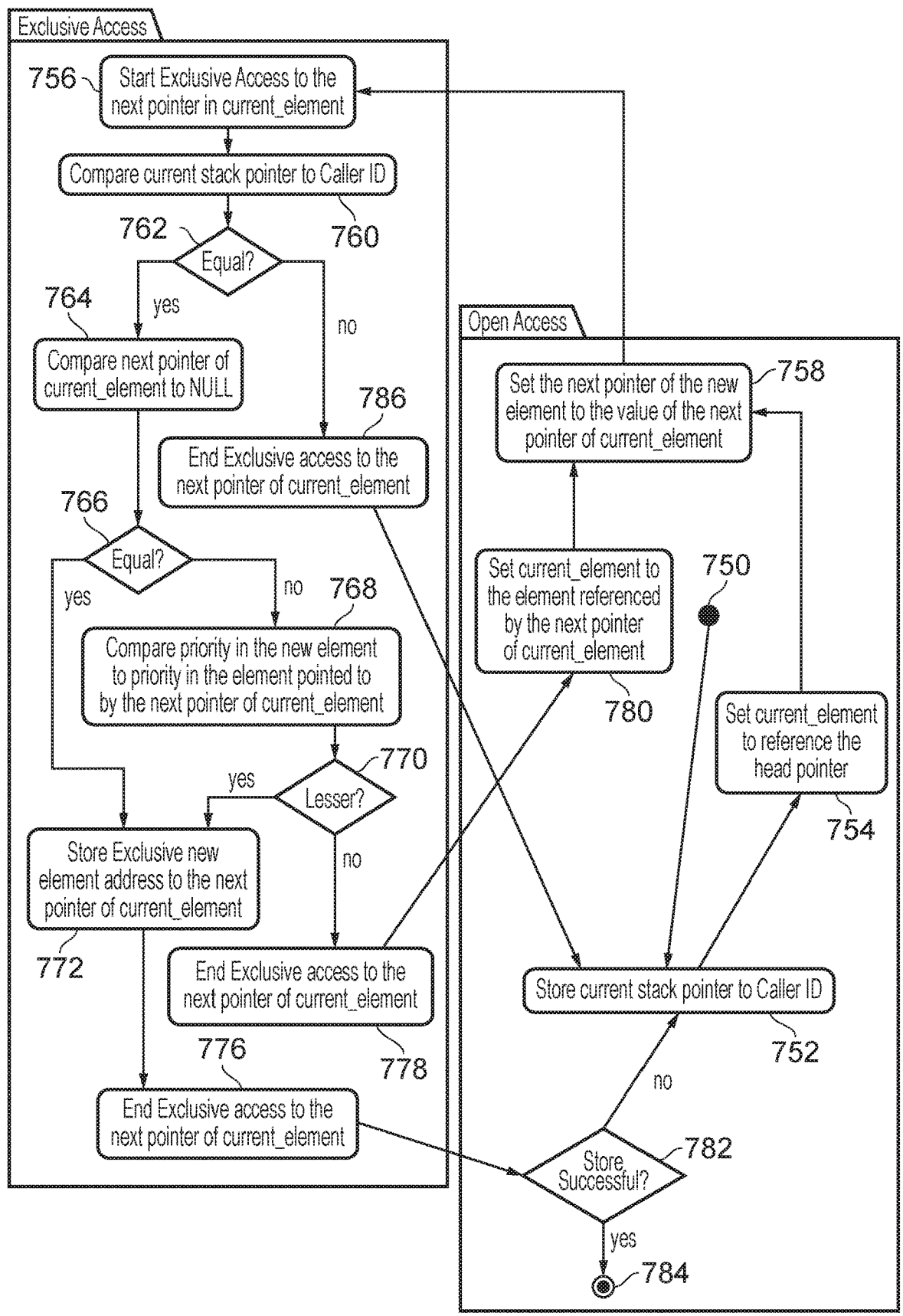

FIG. 7C provides a schematic flowchart indicative of an example of the insert operation.

Note that the pseudocode shown above relates to a simple insert operation at a list position established in advance, whereas the flowchart relates to another, slightly different, example of an ordered or priority-based insert operation. In this example, each element including the element 740 to be inserted has an associated "priority" value or attribute (which could be, for example, an integer numerical value). In the process to be described below, at each step through the list (starting from, for example, the head or first element), the priority value of the new or inserted element 740 is compared with the priority values within the existing list. Various examples are possible.

In one arrangement involving a descending priority, the new element 740 should be inserted before an element having a lower priority value than the new element 740. Such an example (with reference to FIGS. 7A and 7B) might be:

| Element in FIG. 7A | Priority |
|---|---|
| 710 | 9 |
| 720 | 3 |
| 730 | 1 |

| Element in FIG. 7B | Priority |
|---|---|
| 710 | 9 |
| 740 [inserted] | 5 |
| 720 | 3 |
| 730 | 1 |

In another example involving an ascending priority, the new element 740 should be inserted before an element having a greater priority than the inserted element. Such an example (again with reference to FIGS. 7A and 7B) might be:

| Element in FIG. 7A | Priority |
|---|---|
| 710 | 1 |
| 720 | 7 |
| 730 | 9 |

| Element in FIG. 7B | Priority |
|---|---|
| 710 | 1 |
| 740 [inserted] | 5 |
| 720 | 7 |
| 730 | 9 |

Referring to the flowchart, after starting at a step 750, at a first functional step 752, the current stack pointer is stored to the Caller ID field. Control passes to a step 754 at which the current element is set to the reference head pointer.

From the step 754, control passes to a step 758 which involves setting the next pointer of the new element to the value of the next pointer of the current element. That way, if the new element is inserted at the list position currently under consideration, it will have the correct next pointer for its inserted location. Note that this applies even if the current element is the last element in the list (having a next pointer of NULL).

Control then passes to a step 756 at which exclusive access is initiated to the next pointer of the current element, for example by reading the head pointer using an exclusive load operation.

At a step 760 the current stack pointer is compared to Caller ID. If these are equal, as detected at a step 762, then the process can safely continue. If not then exclusive access to the head pointer is ended at a step 786 and control returns to a step 752.

Returning to the positive outcome of the step 762, at a step 764 the next pointer of the current element is compared to NULL (i.e. is this the end of the list). If it is, and given that the new element has not yet been inserted (by virtue of the process having continued to this point) then the new element is inserted after the current element by a step 772 storing the new element address to the next pointer of the current element and a step 776 ending exclusive access to the next pointer of the current element. If the store at the step 772 was successful, as detected at a step 782, then the process ends at a step 784. If not, then control returns to the step 752, again representing a continuation of a "Do . . . Until" loop.

Returning to the step 766, if the next pointer of the current element was not NULL then control passes to a step 786 at which the priority test discussed above is performed (note that the priority test was not needed in the outcome discussed above where the current element was at the end of the list, as there was nowhere else left to insert the new element). The example of the priority test shown in FIG. 7C is applicable to an ascending priority system, in that at the step 768 the new element's priority is compared to the priority of the next element pointed to by the current element.

If, at a step 770, the priority of the new element 740 is less than that of the next element pointed to by the current element, then the new element is inserted by the control path involving the steps 772 onwards as discussed above. This represents an example of the ascending priority arrangement discussed above. If not then the loop operation continues through the list by a step 778 ending exclusive access to the next pointer of the current element and a step 780 setting as a replacement "current element" the element referenced by the next pointer of the current element, before continuing a next iteration at the step 756.

Referring to the ascending priority example given above where the new element 740 has a priority of 5, the loop might progress as a first iteration in which the current element 710 has priority 1, and the next element 720 pointed to by current element has priority 7. The test at the step 770 detects that the new element 740 has a lower priority than the next element 720 and so control passes to the step 772 to insert the new element 740 after the current element 710.

Example: Delete

FIGS. 8A and 8B schematically illustrate the "before" and "after" situations for a so-called "delete" operation in which a data item other than the first or last data item is deleted or removed from the partitioned acyclic data structure.

Referring to FIG. 8A, a head data item 800 has a pointer 802 to a first data item 810 of which the pointer 812 points to a second data item 820. The pointer 822 of the second data item points to a third data item 830 having a pointer 832 to a fourth data item 840. As before, further data items may be provided in the structure after the data item 840 but these are omitted from the diagram for clarity of the explanation.

Assume that the delete operation involves deleting the data item 820 as a "deletion target". To achieve this, the pointer 802 is unchanged, but the pointer 812 must be amended to a new value 812' so as to point to the location of the data item 830. The pointer 832 is unchanged.

A pseudocode example will now be given.
8.1. Set the Caller ID field 804 to the current stack pointer;
8.2. Set the current_element to the head element 800;

8.3. Load the next pointer from the current_element (using a load exclusive);
8.4. If the Caller ID field 804 does not contain the current stack pointer, go back to 8.1;
8.5. If the loaded next pointer was NULL, exit with error;
8.6. If the next element pointed to by the next pointer of the current_element does not match the deletion target, set current_element=the next element pointed to by the current_element and go to 8.3;
8.7. (note that this step is reached only when the next element pointed to by the current_element is the deletion target): Load the next pointer from the data item pointed to by the next pointer of current_element. In the example of FIGS. 8a and 8b, this stage is reached when the current_element is 810, the deletion target 820 is pointed to by the current_element's pointer 812, so the step 8.7 involves loading the pointer 822 of the deletion target 820;
8.8. Set the next pointer of current_element to the pointer loaded in step 8.7 (that is to say, in the example, set the pointer 812' to the previous value of the pointer 822, that is to say a pointer to the element 830) (using a store exclusive);
8.9. If the store exclusive failed, go to 8.1;
8.10. Clear exclusive the next pointer of the deletion target.

Note that the test for the deletion target at step 8.6 (and similar functions discussed in the other examples) provides an example in which in which execution of the processing function instance to modify one or more pointers of the partitioned acyclic data structure is configured to modify a particular pointer of the partitioned acyclic data structure, the method comprising the step of: the computer processor detecting, during the period of exclusive access, whether the memory location subject to exclusive access stores data representing the particular pointer to be modified.

A further possible refinement with reference to the "delete" operation discussed above (and which may be relevant to the "pop" operations also discussed) is as follows. Assuming that exclusivity is granted by memory region, in a system where at least two elements reside in different exclusive access regions AND one of these elements contains a pointer to an element in the other region AND an insert is in progress, with the Caller ID already checked AND it is interrupted by a delete of the element that the inserted element would follow, the insert will not fail on store exclusive due to the fact that it is not in the same exclusive access region.

Suppose A→B
Start inserting C after B
Interrupt with Delete B (this operates on the next pointer of A)
Resume inserting C
The final state is:
A
B→C
But the desired state is:
A→C
B One way to provide the desired output state as that when an element is removed from the partitioned acyclic data structure an instruction is executed to STREX NULL (store exclusive a NULL pointer) to the "next" pointer 822 of the deleted item 820. In the above pseudocode, this would occur as stage 8.10 as listed. This provides an example, in the case of a pointer associated with a data item to be deleted, in which the computer processor is configured to execute a store-exclusive operation to store a null value to the memory location of the given pointer.

Figure 8C:
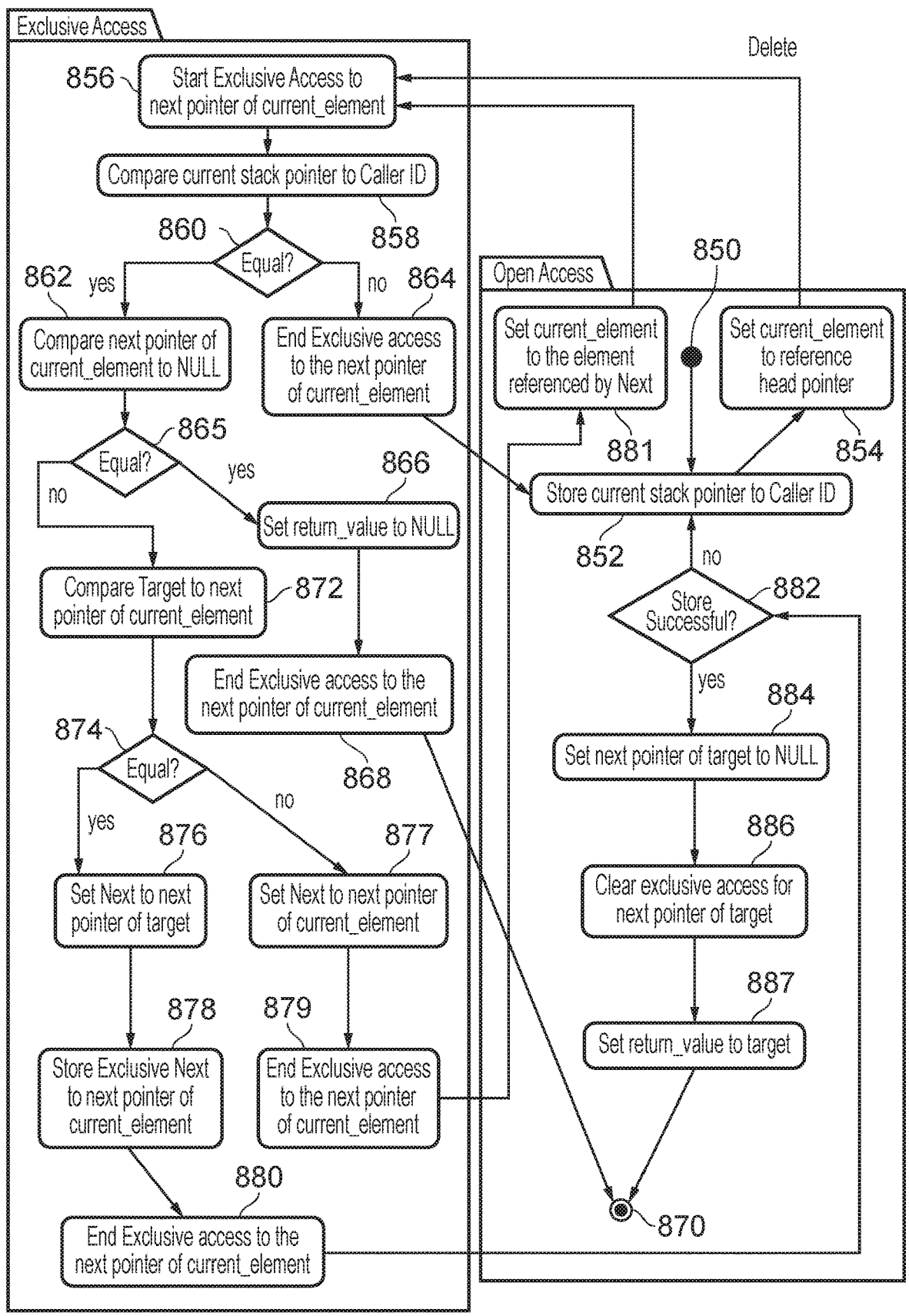

A schematic flowchart representation is provided in FIG. 8C and starts at a step 850 from which control passes to a step 852 at which the current stack pointer is stored to Caller ID, corresponding to the step 8.1 in the pseudocode. Staying within the open access domain, control passes to a step 854 at which the current element is set to the reference head pointer, corresponding to the step 8.2 in the pseudocode. Control then moves into the exclusive access domain in which, at a step 856, exclusive access is started to the next pointer of the current element, for example by an exclusive load operation, corresponding to the step 8.3 of the pseudocode.

At a step 858, the current stack pointer is compared to the Caller ID field. If these are equal, as detected at a step 860, this corresponds to a positive outcome of the step 8.4 in the pseudocode and control passes to a step 862. If not, control passes to a step 864 at which exclusive access to the next pointer of the current element is ended and control returns to the step 852.

Returning to the step 862, the next pointer of the current element is compared to a NULL value. This represents the test performed at step 8.5 of the pseudocode. If these are detected to be equal at a step 865, then the process exits with error, represented by steps 866 at which Return is set to NULL and 868 at which exclusive access is ended to the next pointer of the current element before control passes to the end 870 of the process with an error.

However, if the test of the pseudocode step 8.5 is passed (the loaded next pointer was not NULL, representing the negative outcome of the step 865), then control passes to a step 872 at which the test in the pseudocode step 8.6 is carried out, namely whether the next element pointed to by the next pointer of the current element matches the deletion target or not. Here, a match is indicated by a positive outcome to an equality test 874, which takes control to a step 876, corresponding to the step 8.7 of the pseudocode, at which the variable Next is set to the next pointer of the deletion target's data. At a step 878, corresponding to the step 8.8 of the pseudocode, the variable Next is stored to the next pointer of the current element using a store exclusive operation, exclusive access is ended at a step 880, and control passes to a step 882 from which, if the store was successful, control passes to a step 884 at which the next pointer of the deletion target is set to NULL and, at a step 886, exclusive access is ended for the next pointer of the deletion target and (at a step 887) the return value is set to the target before the process ends at the step 870.

If however, at the step 882, the store was not successful, then (corresponding to the step 8.9 of the pseudocode) control returns to the step 852.

Returning to the step 874, if the next element pointed to by the next pointer of the current element does not match the deletion target (the no outcome of the step 874) then control passes to a step 877 at which the process moves on to the following element to perform the same tests by setting Next to the next pointer of the current element, ending (at a step 879 exclusive access to the next pointer of the current element and setting (at a step 881) the new current element to be that defined by the Next variable. This corresponds to the negative outcome of the step 8.6 in the pseudocode.

Example: Push_Back

Figure 9A:
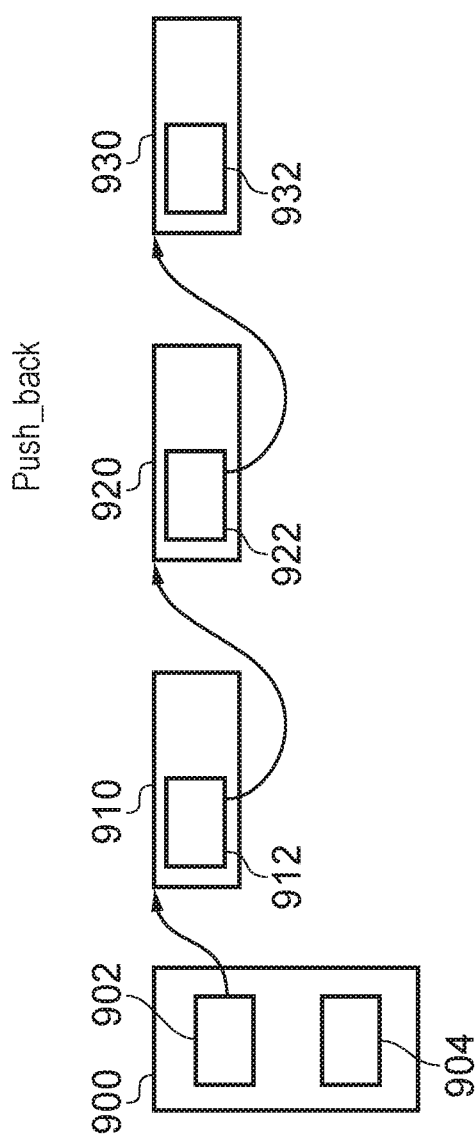
FIGS. 9a to 9c illustrate operations relating to a so-called push_back operation to a partitioned acyclic data structure.
Figure 9B:
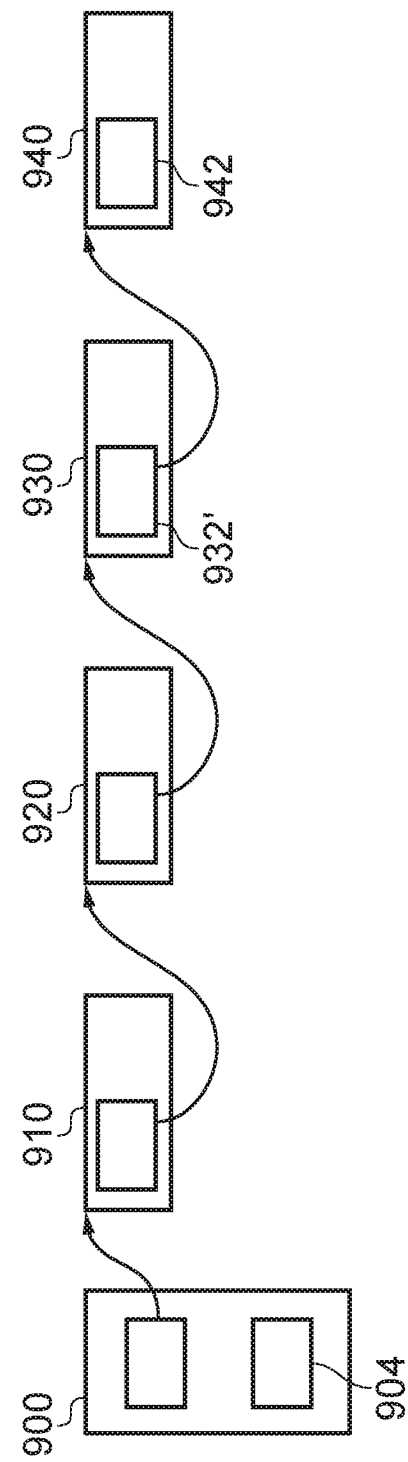

FIGS. 9A and 9B schematically illustrate a so-called push_back operation, with FIG. 9A showing the situation before the operation and FIG. 9B showing the situation after the operation.

Referring to FIG. 9A, a head data item 900 has a pointer 902 to a first data item 910 which in turn has a pointer 912 to a second data item 920. The pointer 922 of the second data item points to a last or end data item 930 which, in place of a pointer has a NULL indicator or flag 932 to show that it is the last data item in the particular data structure under discussion.

The push_back operation involves adding a further data item after the previous end of the partitioned acyclic data structure of FIG. 9A, namely a new last or end data item 940. To achieve this, the data items 900, 910, 920 and their respective pointers are unchanged. The new value of the pointer field 932' of the data item 930 no longer indicates a last data item but instead points to the location of the new last data item 940, of which a pointer field 942 indicates that the data item 940 is now the last data item. Assume that a new element 940 has been prepared and has a NULL pointer 942.

A pseudocode example will now be given.
9.1. Set the Caller ID field 904 to the current stack pointer;
9.2. Set the current_element to the head element 900;
9.3. Load the next pointer from the current_element (using a load exclusive);
9.4. If the Caller ID field 904 does not contain the current stack pointer, go back to 9.1;
9.5. If the next pointer loaded at step 9.3 was NULL (indicating that the current_element is the element 930 at the end of the list in FIG. 9a), set the next pointer of the current element to the address of the new element (using a store exclusive) and exit
9.6. If the store exclusive failed, go to 9.1.
9.7. (assuming that the current_element wasn't the end of the list at the step 9.5) set current_element=next element pointed to by the current_element and go to 9.3.

Figure 9C:
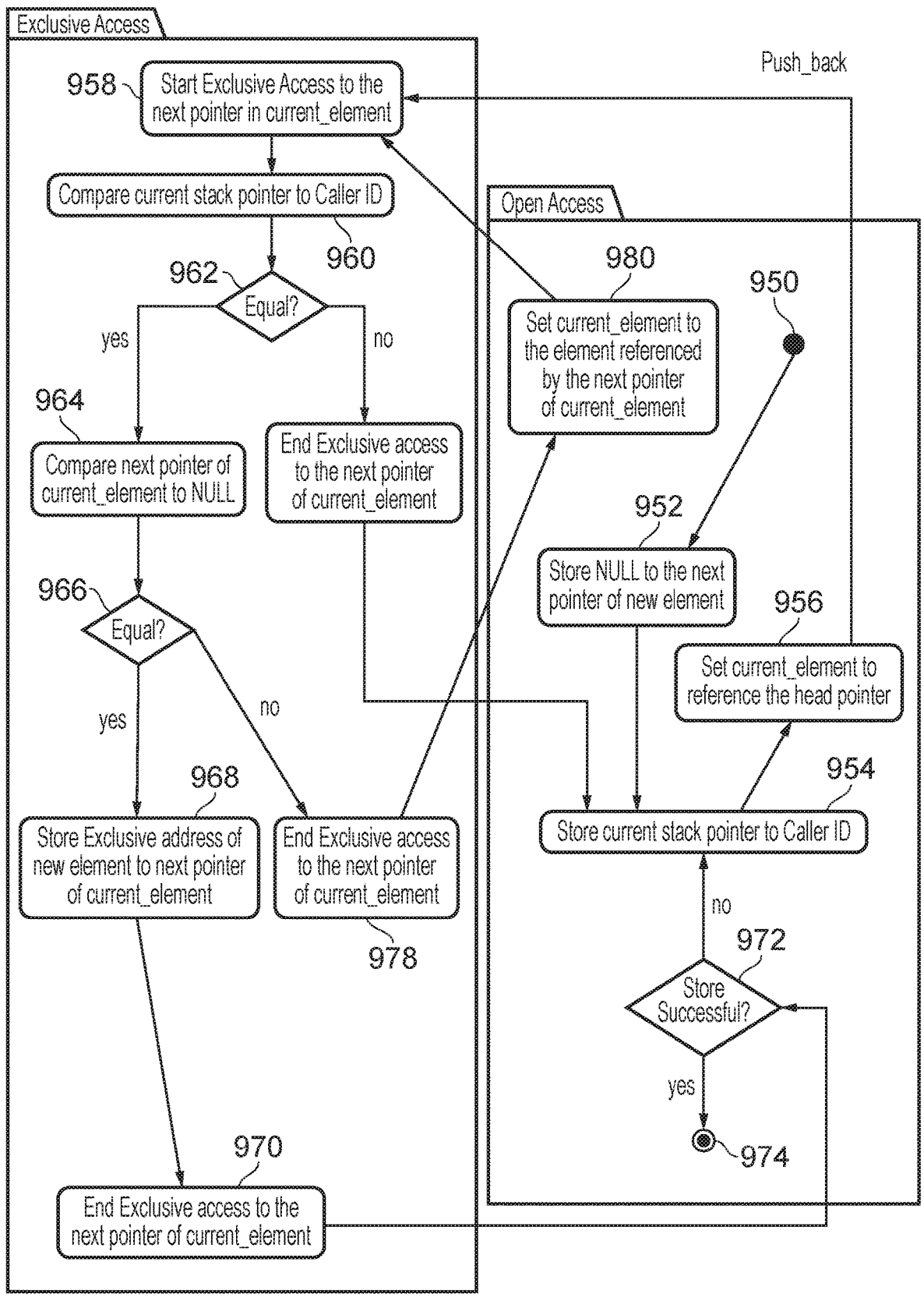

A schematic flowchart relating to the push_back operation is provided in FIG. 9C and starts at a step 950. At a step 952, the next pointer of the new element to be inserted is initialised to NULL. Then, at a step 954, corresponding to the step 9.1 of the pseudocode, the current stack pointer is stored to Caller ID. At a step 956, corresponding to the step 9.2 of the pseudocode, the current element is set to reference the head pointer and control moves into the exclusive access domain in that, at a step 958, exclusive access is started to the next pointer of the current element, for example by loading that pointer using a load exclusive operation.

Then, at a step 960, the current stack pointer is compared to Caller ID. If the two are equal, as detected at a step 962, corresponding to a positive outcome of the step 9.4 of the pseudocode, control passes to a step 964 at which the next pointer of the current element is compared to NULL. If these are equal as detected at a step 966, then control passes to a step 968 at which a store exclusive operation is performed to set the next pointer of the current element to the address of the new element. Exclusive access to the next pointer of the current element ends at a step 970 and control passes to a detection step 972 to detect whether the store was successful. If yes, then the process ends at a step 974.

Note that the positive outcome of the step 966 corresponds to a positive outcome of the test of the step 9.5 of the pseudocode. The negative outcome of the step 966 corresponds to a failure of the test at 9.5 of the pseudocode and control is passed to a step 978 at which exclusive access is ended to the next point of the current element before control is returned to the main loop by executing a step 980 at which the current element is set to the next element pointed to by the current element and control returns to another iteration at the step 958.

Returning to the step 972, if the store was unsuccessful, then control returns to the step 954 to repeat the entire process.

Example: Pop_Back

FIGS. 10A and 10B schematically represent "before" and "after" situations respectively for a so-called pop_back operation in which the current last or end data item in the partitioned acyclic data structure is popped or deleted.

Referring to FIG. 10A, a head data item 1000 has a pointer 1002 to a first data item 1010, to which the pointer 1012 points to a second data item 1020 having a pointer 1022 to a third data item 1030 of which the pointer 1032 points to the last data item 1040 having an indicator 1042 (instead of a pointer) showing that this is the last data item in the partitioned acyclic data structure.

In order to implement the pop_back operation, no change is required to the data items 1000, 1010, 1020. However, the pointer field 1032 of the new last or end data item 1030 has to be changed so that it no longer points to the data item 1040 (which no longer exists in this particular data structure) but instead indicates that the data item 1030 is the last data item in the structure.

A pseudocode example will now be provided.
10.1. Set the Caller ID field 1004 to the current stack pointer;
10.2. Set the current_element to the head element 1000;
10.3. Load the next pointer from the current_element (using a load exclusive);
10.4. If the Caller ID does not contain the current stack pointer, go back to 10.1;
10.5. If the next pointer loaded at step 10.3 was NULL, exit with error;
10.6. Load the next pointer of the element pointed to by the current_element;
10.7. If the pointer loaded at step 10.6 is not NULL, set current_element=the element pointed to by the current_element and go to 10.3.
10.8. (note that steps 10.8 and 10.9 occur only if current_element is now the penultimate element 1030 in FIG. 10a) Set return=the next pointer of the current_element;
10.9. Set the next pointer 1032 of the current element 1030 to NULL to indicate the new end of the list (store exclusive)
10.10. If the store exclusive failed, go to 10.1.
10.11. Return return (as the location of the deleted item, if required)

Figure 10C:
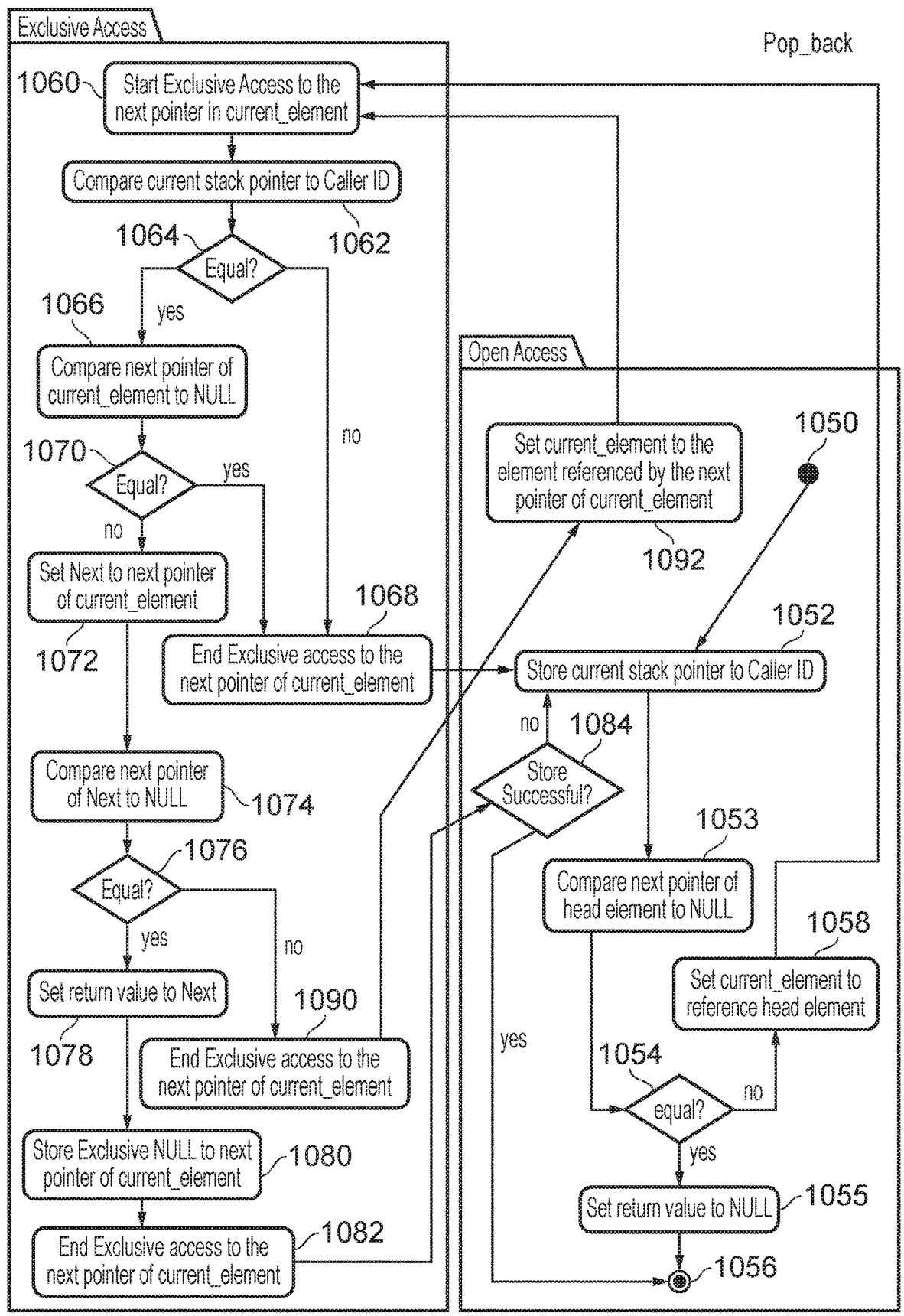

A representation will now be described with reference to FIG. 10C, which provides a schematic flowchart of the pop_back process, starting at a process step 1050 from which control passes to a step 1052 corresponding to a step 10.1 of the pseudocode in which the current stack pointer is stored to Caller ID.

Control passes to a step 1053 at which the next pointer of the head element is compared to NULL (i.e. is the list empty?). If, at a step 1054, the outcome is positive, a return value is set to NULL at a step 1055 and the process ends at a step 1056.

However, assuming the test of the step 1054 has a negative outcome, control passes to a step 1058 at which the current element is set to the head element corresponding to the step 10.2 of the pseudocode. The process flow then moves into the exclusive access domain.

At a step 1060, corresponding to the step 10.3 of the pseudocode, exclusive access is started to a next pointer of the current element, for example by loading that pointer of a load exclusive operation. At a step 1062, the current stack pointer is compared to Caller ID. If these are equal at a step 1064, corresponding to a positive outcome of the step 10.4 of the pseudocode, control passes to a step 1066. If not, control passes to a step 1068 at which exclusive access is ended to the next pointer of the current element and control returns to the step 1052, corresponding to the negative outcome of the step 10.4 of the pseudocode.

At the step 1066, the next pointer of the current element is compared to NULL. If these are equal as detected at a step 1070, then control passes to the step 1068 for another iteration of the program loop. However, if the next pointer of the current element is not NULL then control passes to a step 1072 at which Next is set to the next pointer of the current element.

At a step 1074, the next pointer of the next element is compared to NULL. If it is NULL, as detected at a step 1076 and indicating that the next element is the last in the list, then a return value is set to Next at a step 1078, at a step 1080 NULL is stored to the next pointer of the current element using a store exclusive operation and at a step 1082, exclusive access is ended to the next pointer of the current element.

Assuming, at a step 1084 that the store was successful, the process ends at the step 1066.

If the store was not successful at the step 1084 then control passes to the step 1052 again.

Returning to the step 1076, assuming that the next pointer of the next element was not NULL, then control passes to a step 1090 at which exclusive access to the next pointer of the current element has ended and, at a step 1092, the current element is advanced by one before control returns to the step 1060, corresponding to the positive outcome of the test at the step 10.7 in the pseudocode.

FIG. 11 schematically illustrates a non-transitory machine-readable storage medium 1100 which stores a partitioned acyclic data structure comprises a set of linked data items, each data item comprising a memory location to store data representing a pointer to a next data item in the partitioned acyclic data structure; and which provides a data field 1110 associated with the partitioned acyclic data structure to store a function-call identifier of an instance of a processing function in response to initiation of execution of that processing function instance. The non-transitory machine-readable storage medium may be implemented by the memory arrangement 30 and/or the main memory 80, or by another storage medium such as a magnetic or optical disc or a non-transitory electronic memory such as a flash RAM or a ROM.

The processing element 40 and/or the apparatus 20 of FIG. 1, when configured to perform the method of FIG. 4, provides an example of a data processor comprising:

processing circuitry configured, under the control of a set of processing instructions, to perform the steps of:

executing instances of one or more processing functions, each instance of a processing function having an associated function-call identifier; and in response to initiation of execution of a given processing function instance configured to modify one or more pointers of a partitioned acyclic data structure:

storing the function-call identifier for that processing function instance in association with the partitioned acyclic data structure;

for a memory location storing data representing a given pointer of the partitioned acyclic data structure, defining a period of exclusive access to at least that memory location by applying and subsequently releasing an exclusive tag for at least that memory location; and selectively processing the given pointer during the period of exclusive access in dependence upon whether the function-call identifier of the prevailing processing function instance is identical to the function-call identifier stored in association with the partitioned acyclic data structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A computer-processor-implemented data processing method comprising:

a computer processor executing instances of one or more processing functions, each instance of a processing function having an associated function-call identifier; and in response to initiation of execution by the computer processor of a given processing function instance configured to modify one or more pointers of a partitioned acyclic data structure:

the computer processor storing the function-call identifier for that processing function instance in a memory at a storage location associated with the partitioned acyclic data structure;

for a memory location which stores data representing a given pointer of the partitioned acyclic data structure, the computer processor defining a period of exclusive access to at least that memory location by applying and subsequently releasing an exclusive tag for at least that memory location; and the computer processor selectively processing the given pointer during the period of exclusive access in dependence upon whether the function-call identifier of the prevailing processing function instance is identical to the function-call identifier stored in association with the partitioned acyclic data structure, wherein the selective processing step comprises:

the computer processor modifying the given pointer when the function-call identifier of the prevailing processing function instance is identical to the function-call identifier stored in association with the partitioned acyclic data structure;

the computer processor inhibiting modification of the given pointer when the function-call identifier of the prevailing processing function instance is different to the function-call identifier stored in association with the partitioned acyclic data structure.

2. The method according to claim 1, in which the partitioned acyclic data structure comprises a set of linked data items, each data item comprising a memory location to store data representing a pointer to a next data item in the partitioned acyclic data structure.

3. The method according to claim 2, in which the storing step comprises the computer processor storing the function-call identifier in the memory at a storage location associated with a first data item in the set of linked data items.

4. The method according to claim 3, in which the storing step comprises the computer processor storing the function-call identifier as at least a part of the first data item in the set of linked data items.

5. The method according to claim 2, in which the function-call identifier for a processing function instance comprises one or more identifiers selected from the list consisting of:
- a processor stack pointer associated with that processing function instance;
- an identifier of a memory context allocated to that processing function instance;
- a program counter value dependent upon an entry point of that processing function; and
- a thread identifier combined with an interrupt identifier.

6. The method according to claim 2, comprising the step of the computer processor iteratively performing the defining step and the selective processing step for successive pointers associated with successive data items of the set of linked data items.

7. The method according to claim 6, in which execution of the processing function instance to modify one or more pointers of the partitioned acyclic data structure is configured to modify a particular pointer of the partitioned acyclic data structure, the method comprising the step of:
the computer processor detecting, during the period of exclusive access, whether the memory location subject to exclusive access stores data representing the particular pointer to be modified.

8. The method according to claim 1, in which the defining step comprises the computer processor applying and subsequently releasing an exclusive tag a range of memory locations including at least the memory location for the given pointer.

9. The method according to claim 1, in which the defining step comprises:
the computer processor executing a load-exclusive operation to load from the memory location of the given pointer; and
the computer processor subsequently executing one of:
a store-exclusive operation to store a value to the memory location of the given pointer; or
a clear-exclusive operation to clear the exclusive tag associated with at least the memory location of the given pointer, and
in which, in the case of a pointer associated with a data item to be deleted, the computer processor is configured to execute a store-exclusive operation to store a null value to the memory location of the given pointer.

10. A non-transitory machine-readable storage medium which stores program instructions which, when executed by a computer processor, cause the computer processor to perform the steps of a method comprising:
executing instances of one or more processing functions, each instance of a processing function having an associated function-call identifier; and
in response to initiation of execution of a given processing function instance configured to modify one or more pointers of a partitioned acyclic data structure:
storing the function-call identifier for that processing function instance in association with the partitioned acyclic data structure;
for a memory location storing data representing a given pointer of the partitioned acyclic data structure, defining a period of exclusive access to at least that memory location by applying and subsequently releasing an exclusive tag for at least that memory location; and
selectively processing the given pointer during the period of exclusive access in dependence upon whether the function-call identifier of the prevailing processing function instance is identical to the function-call identifier stored in association with the partitioned acyclic data structure,
wherein the defining step comprises:
the computer processor executing a load-exclusive operation to load from the memory location of the given pointer; and
the computer processor subsequently executing one of:
a store-exclusive operation to store a value to the memory location of the given pointer; or
a clear-exclusive operation to clear the exclusive tag associated with at least the memory location of the given pointer.

11. A data processor comprising:
processing circuitry configured, under the control of a set of processing instructions, to perform the steps of:
executing instances of one or more processing functions, each instance of a processing function having an associated function-call identifier; and
in response to initiation of execution of a given processing function instance configured to modify one or more pointers of a partitioned acyclic data structure:
storing the function-call identifier for that processing function instance in association with the partitioned acyclic data structure;
for a memory location storing data representing a given pointer of the partitioned acyclic data structure, defining a period of exclusive access to at least that memory location by applying and subsequently releasing an exclusive tag for at least that memory location; and
selectively processing the given pointer during the period of exclusive access in dependence upon whether the function-call identifier of the prevailing processing function instance is identical to the function-call identifier stored in association with the partitioned acyclic data structure,
wherein the partitioned acyclic data structure comprises a set of linked data items, each data item comprising a memory location to store data representing a pointer to a next data item in the partitioned acyclic data structure;
the method further comprising the computer processor iteratively performing the defining step and the selective processing step for successive pointers associated with successive data items of the set of linked data items,
wherein execution of the processing function instance to modify one or more pointers of the partitioned acyclic data structure is configured to modify a particular pointer of the partitioned acyclic data structure, the method further comprising the computer processor detecting, during the period of exclusive access, whether the memory location subject to exclusive access stores data representing the particular pointer to be modified.

\* \* \* \* \*